US012578957B1

(12) United States Patent
Das

(10) Patent No.: US 12,578,957 B1
(45) Date of Patent: Mar. 17, 2026

(54) FIRMWARE UPDATE PROCESS

(71) Applicant: Block, Inc., Oakland, CA (US)

(72) Inventor: Abhishek Das, Mississauga (CA)

(73) Assignee: Block, Inc., Oakland, CA (US)

( * ) Notice: Subject to any disclaimer, the term of this patent is extended or adjusted under 35 U.S.C. 154(b) by 63 days.

(21) Appl. No.: 18/087,701

(22) Filed: Dec. 22, 2022

(51) Int. Cl.
*G06F 8/656* (2018.01)

(52) U.S. Cl.
CPC .................................... *G06F 8/656* (2018.02)

(58) Field of Classification Search
CPC ......... G06F 8/65; G06F 8/654; G06F 13/4282
See application file for complete search history.

(56) References Cited

U.S. PATENT DOCUMENTS

2006/0126652 A1 * 6/2006 Berry ...................... H04L 69/24
370/468

2007/0208819 A1 * 9/2007 Talbot ..................... H04L 1/205
709/208
2011/0194493 A1 * 8/2011 Centonza .......... H04W 52/0235
370/328
2017/0286085 A1 * 10/2017 Steshenko ............. G06F 8/4434
2019/0188743 A1 * 6/2019 Phillips .............. G06Q 30/0205
2021/0326331 A1 * 10/2021 Shin ........................ H04L 69/16
2022/0070257 A1 * 3/2022 Cunningham ...... H04L 43/0852
2024/0053160 A1 * 2/2024 Andrae ............. G01C 21/3484

* cited by examiner

*Primary Examiner* — Duy T Nguyen
(74) *Attorney, Agent, or Firm* — Polsinelli PC

(57) ABSTRACT

A master device may transfer firmware data for installation on a slave device to the slave device at a data transfer rate. The master device may receive, from the slave device, information indicative of one or more errors in the firmware data received at the slave device. The master device may adjust the data transfer rate responsive to the information indicative of the one or more errors, for instance to increase or decrease the data transfer rate based the information indicative of the one or more errors.

24 Claims, 6 Drawing Sheets

FIRMWARE UPDATE PROCESS

TECHNICAL FIELD

A payment reader is a device that processes payment transactions. A payment reader is configured to interact with one or more of a payment card having a magnetic strip that is swiped in a magnetic reader of the payment reader, a payment device having a Europay/Mastercard/Visa (EMV) chip that is dipped into a corresponding EMV slot of a payment terminal, or near field communication (NFC) enabled devices such as a smartphone or EMV card that is tapped at the payment reader and transmits payment information over a secure wireless connection. The payment reader receives payment information from the payment device and communicates this information to a payment system for processing of the transaction.

To support processing of payment transactions, payment readers may operate using various electronic components, e.g. chips, which are operated by firmware including instructions for operation of the payment reader or sub-components of the payment reader. The instructions may include a bootloader that initializes the payment reader and one or more firmware modules that control the operation of the payment reader.

From time-to-time, the firmware of the payment reader, or of particular components thereof, may require updating, for example, to enhance security, implement additional functionality, and fix bugs. Firmware updates may be provided over a network to the payment reader.

BRIEF DESCRIPTION OF THE DRAWINGS

Features of the present disclosure, its nature and various advantages, will be more apparent upon consideration of the following detailed description, taken in conjunction with the accompanying drawings, which is set out below. In the drawings, the use of the same reference numbers in different drawings indicates similar or identical items. The systems depicted in the accompanying drawings are not to scale and components within the drawings may be depicted not to scale with each other.

DETAILED DESCRIPTION

Figure 1:
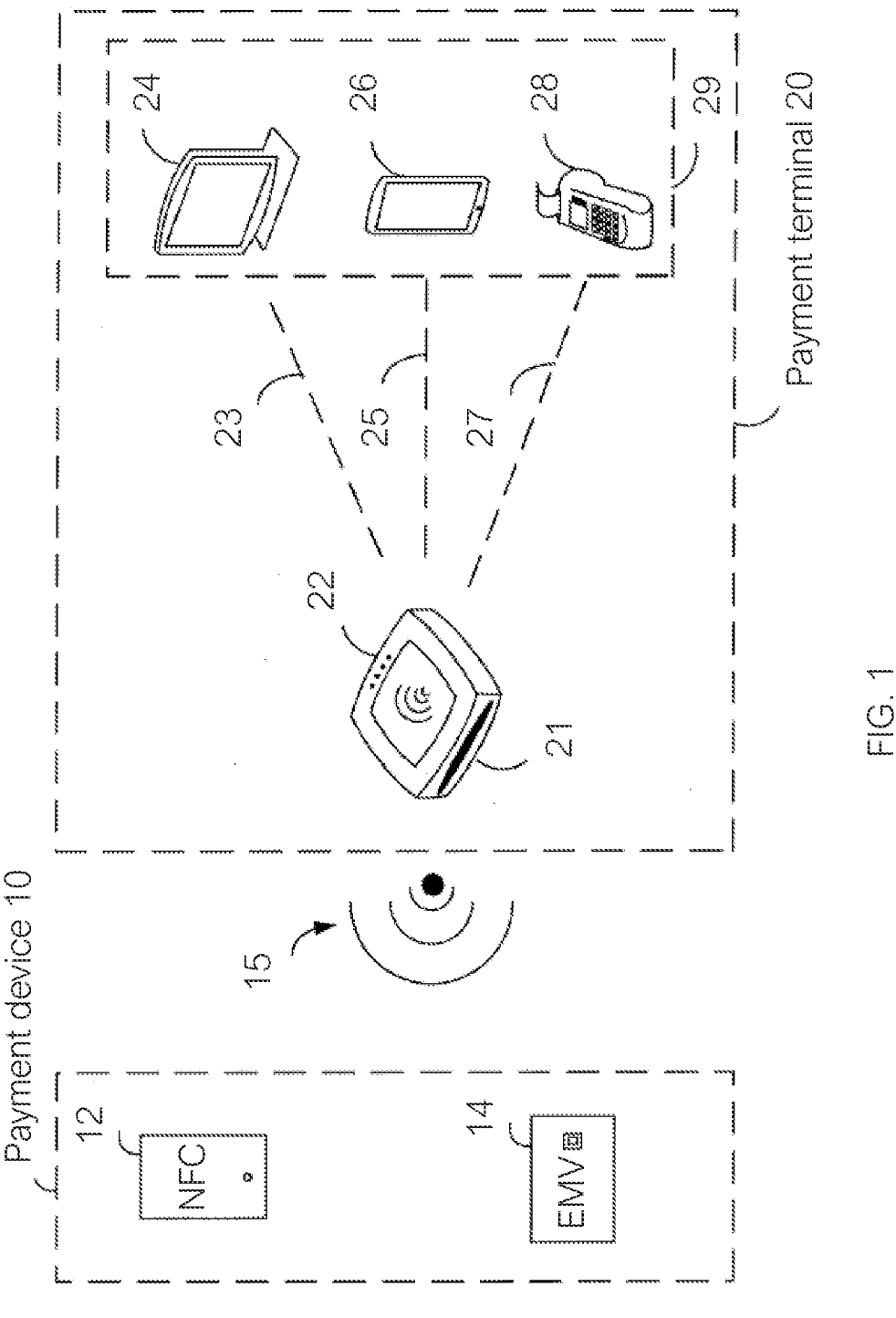
FIG. 1 illustrates an example block diagram of a payment device, from which a customer makes a payment, and a payment terminal on which firmware is to be updated.

A firmware update to a device such as a payment reader renders the device unusable during the update. Device updates may take sizeable amounts of time to complete, and during this time, a user of the device may not be able to use the functionality of the device. Long downtimes during firmware updates are therefore undesirable. The user is likely to perceive this amount of time as longer than it is in reality due to the device being unusable during the update. A technical problem of a long downtime when a device is unable to perform its usual functionality during firmware updates is overcome by controlling a speed of transferring firmware data between components involved in the firmware update. In particular, by enabling a master device, which provides the firmware update data, to vary and/or adjust the speed at which it sends data to a slave device that has firmware to be updated, the overall time that the payment reader may be inactive for the firmware update can be reduced.

This problem is exacerbated when the user is a merchant using the payment reader to take financial transactions, e.g. in a shop or restaurant, because the merchant is unable to use the payment reader when firmware is being updated. This in turn can result in lost revenue and/or poor customer service. Additionally, during a firmware update, all functionality of the device being updated may be inactive. Having an inactive device that cannot perform its usual function is unacceptable for many use cases including the payment readers discussed above.

The length of time that the firmware update process takes increases when the firmware installation device re-sends data or commands to the payment reader due to transmittal errors. Errors often increase when data is being transmitted too fast. The rate of such errors can also increase if there is an increase in electromagnetic interference (EMI) in the locality of the device having its firmware updated or installed, or increase for other reasons.

These problems are overcome, at least in part, by the method disclosed herein wherein a bit rate of firmware data being transferred within a payment reader being updated can be dynamically changed based on an error rate associated with transferring the firmware data, allowing a speed at which firmware data is transferred to increase when the error rate is below an acceptable level. In some cases, the acceptable level may be zero errors, or a predetermined threshold error level where it is determined that the erroneous data can be reconstructed such that there are no errors in the running of the firmware. As a result, the overall time for performing the firmware update can be reduced. This is particularly noticeable when compared to a process that transfers the firmware data at a fixed data rate. This is because the data rate for transferring firmware data to the payment terminal to be updated can be set to a high or maximum data rate, and then only reduced to the extent it is necessary due to too many errors occurring during data transfer. If the data rate is reduced but errors stop, then the data rate can be increased again. Hence, the average data rate for the transfer of data in the process described herein can be significantly higher than the average data rate in processes that set a fixed data rate. This is because such processes usually transfer data at a rate that is known to be unlikely to result in any or many errors and incapable of dynamically changing.

In practice, the firmware data is transmitted using packets or chunks which include checksum data to enable a check as to whether the firmware data received in a packet at the payment terminal matches (e.g., is the same as) the firmware data sent in the same packet by a firmware installation device. From this error checking process, the payment terminal can share information relating to errors with the firmware installation device.

The method for controlling a speed of transferring firmware data during a firmware installation process disclosed herein overcomes various technical problems. The process enables the dynamic control of speed of transferring firmware data depending on an error rate. In turn, this can increase the speed at which data can be pushed through from a master device that is controlling the firmware update process to a slave device to apply the firmware update at a part of the payment reader that is having its firmware updated while reducing the chance of an error.

FIG. 1 illustrates an example block diagram of a payment device 10, from which a customer makes a payment, and a payment terminal 20 on which firmware is to be updated. Although it will be understood that payment device 10 and the payment terminal 20 of a payment system 1 may be implemented in any suitable manner, the payment terminal 20 may include a payment reader 22 and a merchant device 29. However, it will be understood that as used herein, the term payment terminal may refer to any suitable component of the payment terminal, such as payment reader 22. In an arrangement, the payment reader 22 of the payment terminal 20 may be a wireless communication device that facilitates transactions between the payment device 10 and a merchant device 29 running a Point-Of-Sale (POS) application.

The payment device 10 may be a device that is capable of communicating with the payment terminal 20 (e.g., via the payment reader 22), such as a NFC device 12 or an EMV chip card 14. The chip card 14 may include a secure integrated circuit that is capable of communicating with a payment terminal such as the payment terminal 20, generating encrypted payment information, and providing the encrypted payment information as well as other payment or transaction information (e.g., transaction limits for payments that are processed locally) in accordance with one or more electronic payment standards such as those promulgated by EMVCo. The chip card 14 may include contact pins for communicating with the payment reader 22 (e.g., in accordance with ISO 7816) and may be inductively coupled to the payment reader 22 via a near field 15. The chip card 14 that is inductively coupled to the payment reader 22 may communicate with the payment reader 22 using load modulation of a wireless carrier signal that is provided by the payment reader 22 in accordance with a wireless communication standard such as ISO 14443. The NFC device 12 may be an electronic device such as a smart phone, tablet, or smart watch that is capable of engaging in secure transactions with the payment terminal 20 (e.g., via communications with the payment reader 22). The NFC device 12 may have hardware (e.g., a secure element including hardware and executable code) and/or software (e.g., executable code operating on a processor in accordance with a host card emulation routine) for performing secure transaction functions. During a payment transaction, the NFC device 12 may be inductively coupled to the payment reader 22 via the near field 15 and may communicate with the payment terminal 20 by active or passive load modulation of a wireless carrier signal provided by the payment reader 22 in accordance with one or more wireless communication standards such as ISO 14443 and ISO 18092.

Although the payment terminal 20 may be implemented in any suitable manner, the payment terminal 20 may include the payment reader 22 and the merchant device 29. The merchant device 29 may run a POS application that provides a user interface for the merchant and facilitates communication with the payment reader 22 and the payment server 40. The payment reader 22 may facilitate communications between the payment device 10 and the merchant device 29.

As described herein, the payment device 10 such as the NFC device 12, e.g. implemented on a smartphone, or the chip card 14 may communicate with the payment reader 22 via inductive coupling.

The payment reader 22 may also include an EMV slot 21 that is capable of receiving the chip card 14. The chip card 14 may have contacts that engage with corresponding contacts of the payment reader 22 when the chip card 14 is inserted into the EMV slot 21. The payment reader 22 provides power to an EMV chip of the chip card 14 through these contacts and the payment reader 22 and the chip card 14 communicate through a communication path established by the contacts. The payment reader 22 may also include hardware for interfacing with a magnetic strip card (not depicted in FIG. 1).

It may be helpful or necessary at certain points in time for firmware on the payment reader 22 to be updated, for example, to fix bugs or resolve issues with, or enhance, the security of the device. As an example, regulations or standards applicable to transactions involving various methods that may be used by the payment device 10 (e.g., NFC communications and EMV cards) may require the payment terminal 20 to follow new instructions or procedures when processing the transactions. This may result in the firmware of the payment reader 22 or some component thereof being updated in order for the payment reader 22 to process transactions using the new instructions. For example, in some circumstances the main firmware controlling the chip needs to be updated. On other occasions, the firmware of a slave chip or slave chips on the payment reader 22, such as the chips providing Bluetooth or other functionality, need to be updated.

The firmware data may, therefore, be a firmware update of a version of firmware already installed on the slave device, whether that be firmware for controlling the chip or firmware for the slave chip. The firmware data may also be an installation of the firmware update where a master chip of the payment reader 22 is a factory installation device and the step of transferring is a part of an initial factory installation process. The installation of firmware data may be referred to as updating, or the like, and may include, but is not limited to, a general update, and/or a specific update, and/or an initial installation, and/or a reinstallation.

This disclosure relates primarily to updating a slave chip, and particularly the Bluetooth chip. However, as will be discussed, the concepts disclosed herein can be applied to a wide range of applications.

The merchant device 29 may be any suitable device such as a tablet payment device 24, a mobile payment device 26, or a payment terminal 28. In the case of a computing device such as the tablet payment device 24 or the mobile payment device 26, a POS application may provide a means of entry of purchase and payment information, interaction with a customer, and communications with a payment server (not depicted in FIG. 1). For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28. This payment application may enable a merchant to be notified about possible new firmware updates, as well as start and control the firmware update process.

The merchant device 29 may be in communication with the payment reader 22 via a communication path 23/25/27. Although the communication path 23/25/27 may be implemented via a wired (e.g., Ethernet, USB, FireWire, Lightning) or wireless (e.g., Wi-Fi, Bluetooth, NFC, or ZigBee) connection, the payment reader 22 may communicate with the merchant device 29 via a Bluetooth low energy interface, such that the payment reader 22 and the merchant device 29 are connected devices. In some arrangements, processing of the payment transaction may occur locally on the payment reader 22 and the merchant device 29, for example, when a transaction amount is small or there is no connectivity to the payment server. In other arrangements, the merchant device 29 or the payment reader 22 may communicate with a payment server via a public or dedicated communication network (not depicted in FIG. 1). Although the communication network may be any suitable communication network, in one arrangement, the communication network may be the internet, and payment and transaction information may be communicated between the payment terminal 20 and payment server in an encrypted format such by a transport layer security (TLS) or secure sockets layer (SSL) protocol.

Within the payment device 10 and the payment terminal 20 of the system described herein, many of the components use electromagnetic compatibility (EMC) to perform. Therefore, either the components within the payment device 10, or any nearby components using EMC to perform, e.g. any smart phones being used within the system or externally to the system, may impact a performance of transferring firmware data and/or a number of errors that occur during the transfer of firmware data between devices. Controlling or changing the speed of firmware data transfer is therefore advantageous because in areas where there are lots of components using EMC, there may be more errors occurring during firmware data transfer. The number of errors can be reduced by dynamically changing a bit rate of firmware data transfer depending on the number of errors detected. When there are less components using EMC near the transfer of data, the transmission speed may be increased (i.e. the bit rate is increased) because there would likely be fewer errors, and vice versa. EMI is also a challenge when initially installing the firmware due to the impact it may have on errors, i.e. if the firmware is installed in an area where there are a higher number of components using EMC, there may be an increased number of errors during the installation.

Figure 2:
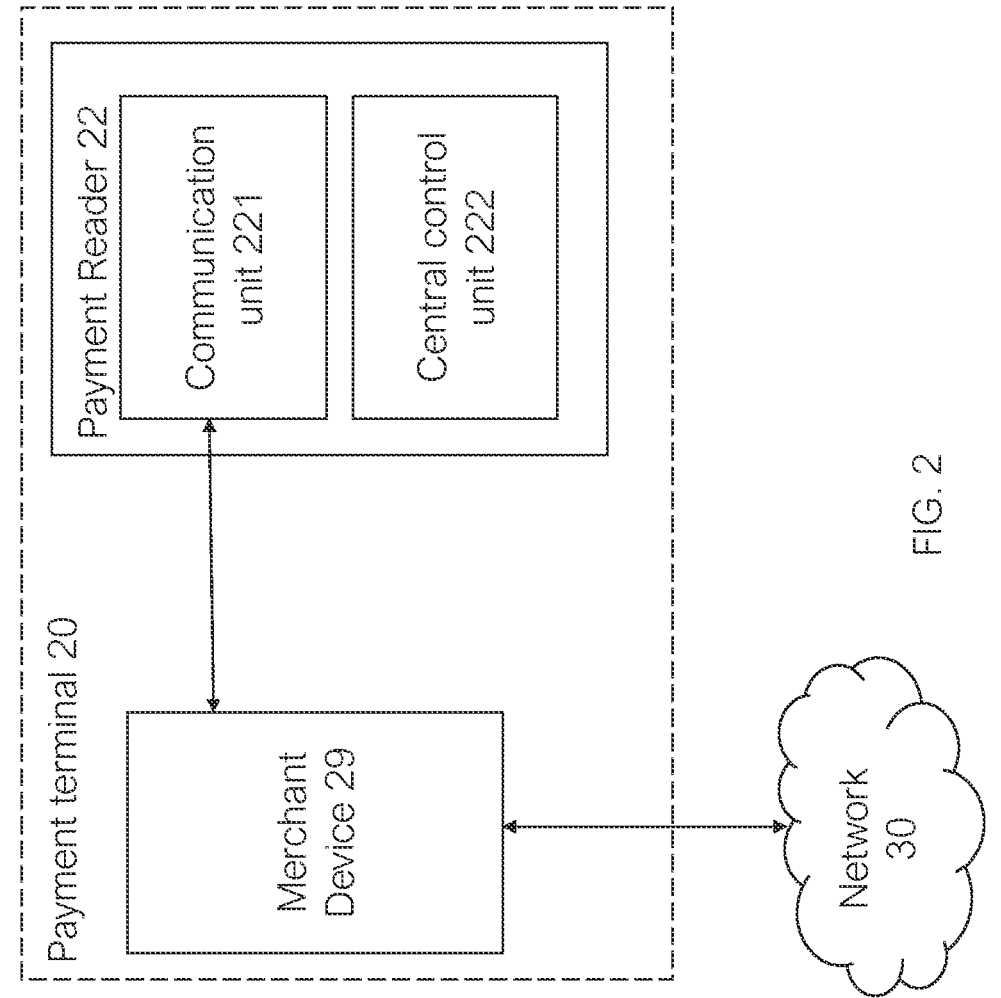
FIG. 2 illustrates an example payment terminal and some of its internal components that play a role in a firmware update process.

FIG. 2 illustrates the payment terminal 20 and some of its internal components that play a role in the firmware update process. The payment reader 22 includes a central control unit 222, which is a chip otherwise known as a host or master chip, that provides the operational functionality of the payment reader 22. The payment reader 22 also includes a communication unit 221, which acts as a communication interface between the central control unit 222 and the merchant device 29. The communication unit 221 may be a wireless communications chip, such as a chip specifically arranged to provide Bluetooth functionality to the payment reader 22. For example, the communication unit 221 may be a Bluetooth chip.

The merchant device 29, or at least the payment application running on the merchant device, is arranged to receive notifications that a firmware update for the payment reader 22 is available from a host (not depicted in FIG. 2), e.g. a server of the company that manufactures the payment reader 22. The merchant device 29 communicates with the host via a network 30. In some arrangements, the merchant can send a request to check for any new firmware updates. The merchant, via the payment application on the merchant device 29, is able to start a firmware update process. Hence, the merchant device 29 acts as a user control for identifying and starting a firmware update. It also acts as a communication bridge through which the firmware update data is obtained from the host and provided to the payment reader 22.

Figure 3:
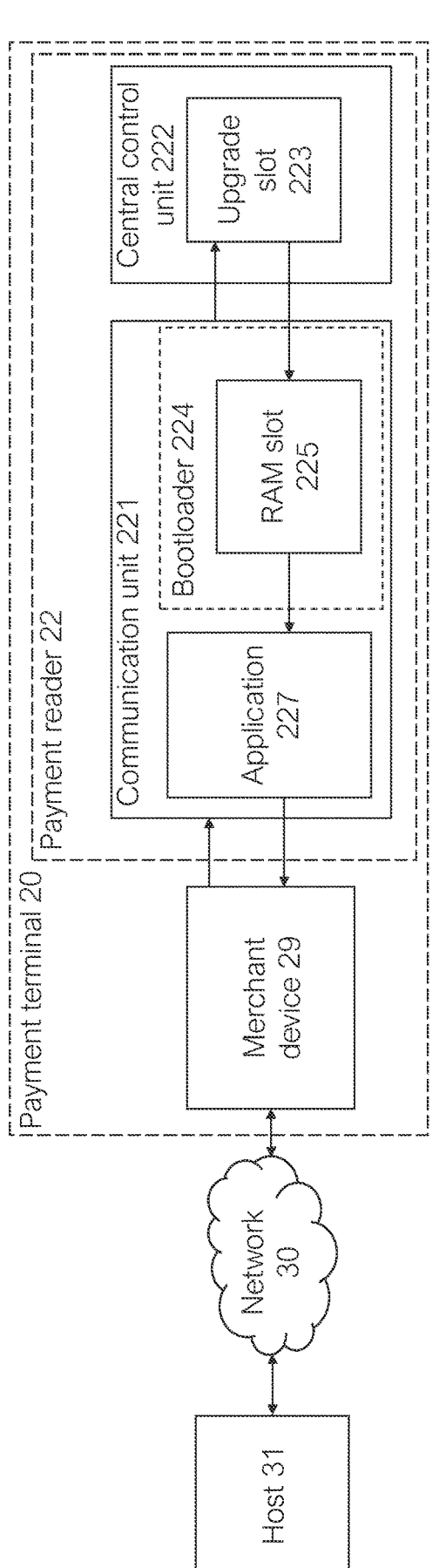
FIG. 3 illustrates an example flow of firmware data between the payment terminal of FIG. 2 and a host in a firmware update process.

FIG. 3 illustrates an example flow of firmware data between the payment terminal 20 of FIG. 2 and the host 31 in the firmware update process. The firmware update includes firmware data originates at the host 31, e.g. a server of the company that manufactures the payment reader 22. The company that manufactures the payment reader makes the firmware update available on the server 31 for download by the payment reader 22. The merchant device 29 is arranged to send a request to the host 31, via the network 30, to start the firmware update process. Upon request, the host 31 starts the firmware update process to send firmware data to the merchant device 29 via the network 30. From the merchant device 29, data included in the firmware update process is sent to the central control unit 222 within the payment reader via the communication unit 221 within the payment reader 22. The firmware data is stored on the central control unit 222 until it is ready for installation on the communication unit 221 within the payment reader 22.

Firmware data is sent from the merchant device 29 via the communication unit 221 to the central control unit 222 with the aim of sending an entire firmware image to the central control unit 222 to be applied to the payment reader 22 via the communication unit 222. Firmware images include software that is able to control a device e.g. the payment reader 22 and are maintained on the device in locations called slots. In the central control unit 222, the slot may be an upgrade (or alternate) slot 223. In the communication unit 221, the slot(s) may be a Random Access Memory (RAM) slot 225. In some implementations, the RAM slot 225 may also include flash memory or may instead be flash memory instead of RAM. Installing the firmware on the slave device includes writing the firmware data to flash on the slave device, or to a slot in flash on the slave device.

Firmware slot information is gathered to determine which slot can be used as the upgrade slot 223 to store the firmware image. As firmware data is sent to the central control unit 222, it is stored in the upgrade slot 223 of the central control unit 222. An upgrade slot 223 is a writeable slot which is not currently active. When the entire firmware image has been stored in the upgrade slot 223, either sent as a whole firmware image or as firmware data packets in succession, the firmware image is copied from the upgrade slot 223 of the central control unit 222 and applied to the communication unit 221 via the RAM slot 225 of the communication unit 221. It may be advantageous to send the firmware image in firmware data packets rather than writing data byte by byte because time can be saved at the payment reader 22. Sending firmware data in packets allows faster transmission speeds for certain packets and the preservation of firmware data if any errors occur when firmware data is being written to the upgrade slot. Each of the communication unit 221 and the central control unit 222 may include a plurality of slots.

Both of the RAM slot 225 and the active slot 226 are within a bootloader 224 of the communication unit 221. The bootloader 224 checks for errors during the firmware data write from the upgrade slot 223 to the RAM slot 225 and confirms authenticity before booting the update to the payment reader 22 and resetting to complete the upgrade or installation.

It may be advantageous to store low amounts of data (or no data) on the communication unit 221 to keep the communication unit 221 as stateless as possible. Storing the firmware data on the central control unit 222 may reduce flash memory used in flash storage of the communication unit 221. Flash storage is an electrically programmable memory that is arranged to write data and perform input/output (I/O) operations at high-speed. Flash memory is a type of nonvolatile memory.

In some arrangements, once the upgrade slot 223 is full or reaches a certain amount of data, the chunks currently stored in the upgrade slot 223 of the central control unit 222 are written to the RAM slot 225 of the communication unit's flash memory to enable further firmware data to be written to the upgrade slot 223. Data cannot be written to the active slot 226, only applied, because the booting process is run from the active slot 226. When the entire firmware image is applied to the active slot 226 of the bootloader 224, the firmware update is installed to the application 227 of the communication unit 221. The firmware image may be verified to prove that the image was created by a trusted source, or to verify the integrity of the firmware. The firmware image may be verified using a verification key, or a signature, or a Sign Key.

Figure 4:
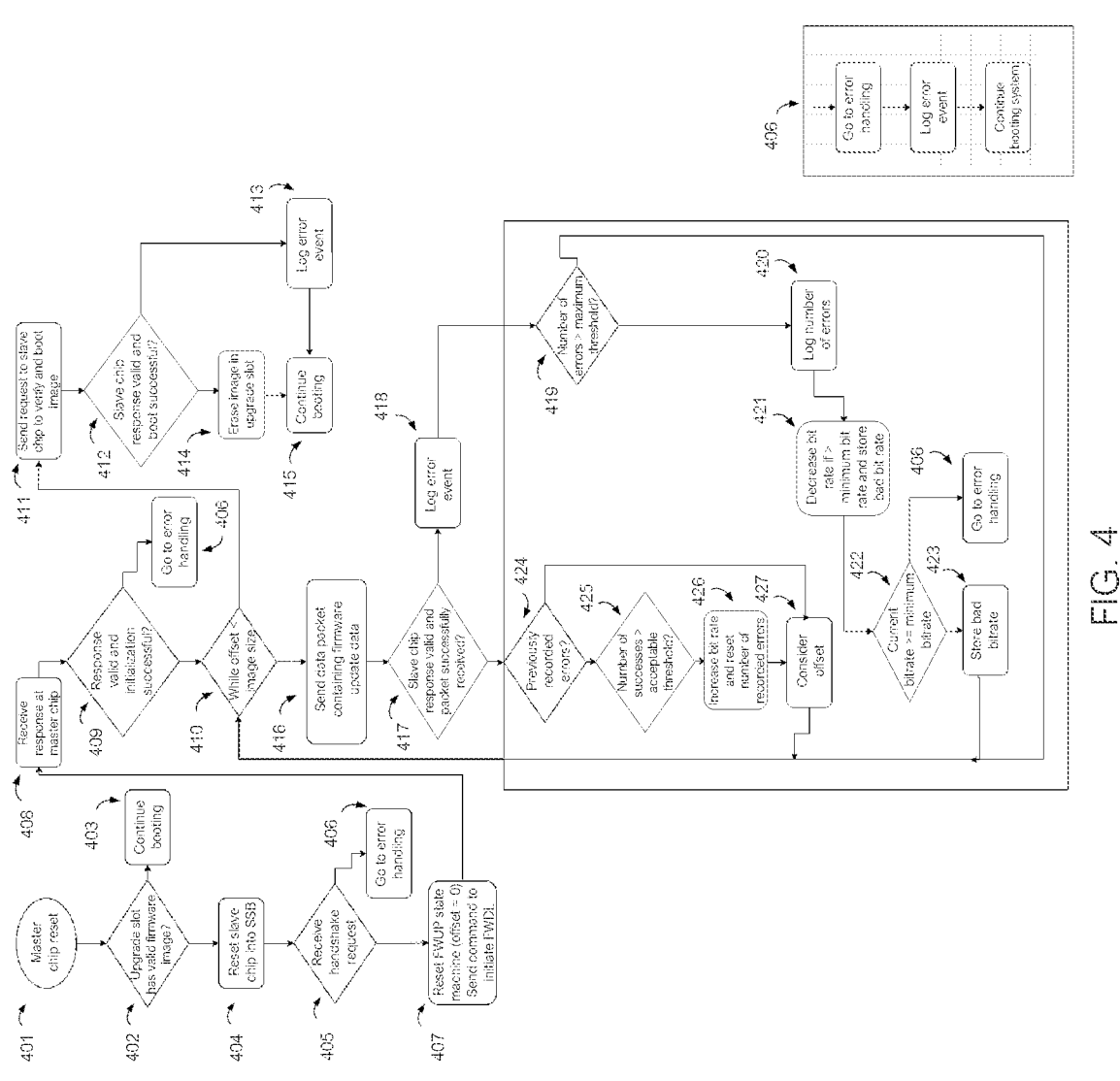
FIG. 4 illustrates an example flow diagram illustrating exemplary steps for updating firmware of a payment reader from the perspective of a central control unit of the payment reader.

FIG. 4 is an example flow diagram illustrating exemplary steps for updating firmware of a payment reader 22 from the perspective of the central control unit 222 of the payment reader 22. The description of FIG. 5 focuses on the internal functioning and interactions of the chips in the payment reader 22. Since the central control unit 222 controls the operation of the communication unit 221, these two units will be referred to as the slave chip and master chip in relation to this and latter figures. The master device may be called a "first chip", "first device", a "host chip", a "master chip" and/or a "host". The slave device may be called a "second chip", "second device", a "Bluetooth chip", a "slave chip" and/or a "chip". It will be appreciated that the processes described in relation to FIG. 4 may apply to any master chip updating a related slave chip. The master chip and slave chip may be within a single system, as depicted in FIGS. 2 and 3, and this single system may be one of a POS, a terminal, or a cryptocurrency hardware wallet. The processes described in relation to FIG. 4 may also apply to devices other than chips. For example, a desktop personal computer may update firmware of a keyboard over a communication layer.

The slave chip (e.g., communication unit 221) includes a bootloader. The bootloader in the slave chip (e.g., communication unit 221) is responsible for receiving the firmware data (e.g. firmware image) for the update or upgrade from the master chip (e.g., central control unit 222). The bootloader in the slave chip (e.g., communication unit 221) is responsible for verifying the firmware image from the master chip (e.g., central control unit 222) and, in the case of the bootloader update, copying the firmware image from the upgrade slot 223 of the master chip (e.g., central control unit 222) to the active slot 226 of the slave chip (e.g., communication unit 221).

Steps 401 to 410 describe the method of establishing communication between the master chip (e.g., central control unit 222) and the slave chip (e.g., communication unit 221) and setting up the payment reader 22 for proceeding with a firmware update using the central controller of the master chip (e.g., central control unit 222) and the bootloader 224 of the slave chip (e.g., communication unit 221). At step 401, the master chip (e.g., central control unit 222) is reset, and the firmware image sent from the merchant device 29 in relation to FIG. 4 is verified at the upgrade slot 223 (step 402). The reset may be similar to a system reset to apply the update to the slave chip (e.g., communication unit 221). If a valid firmware image is not verified at step 402, then the master chip (e.g., central control unit 222) continues booting the firmware image from the merchant device 29 (step 403) as described above in relation to FIG. 4, until a valid firmware image is verified. In another example, the master chip may halt booting and signal an error to the user to enter error handling mode. In error handling mode, an error event is logged and the master chip (e.g., central control unit 222) continues booting the firmware image from the merchant device 21 as described above. If a valid firmware image is verified at step 402, then the slave chip (e.g., communication unit 221) is reset to begin receiving the firmware update from the master chip (e.g., central control unit 222) (step 404). The reset may be similar to a system reset to apply the update to the slave chip (e.g., communication unit 221) once it has been received by the master chip (e.g., central control unit 222).

After the slave chip (e.g., communication unit 221) is reset and at step 405, a handshake request is sent from the master chip (e.g., central control unit 222) and received at the slave chip (e.g., communication unit 221) to quickly verify that the master chip (e.g., central control unit 222) can communicate with the slave chip (e.g., communication unit 221) and/or that the slave chip (e.g., communication unit 221) is currently running and/or to establish communication with the slave chip (e.g., communication unit 221) after the reset of the slave chip (e.g., communication unit 221). If an error is received in response to the handshake request, the handshake request is re-sent to the slave chip (e.g., communication unit 221) and the response is checked one or more times, and potentially up to five times. If an error is received in response to the re-sent handshake request(s), the attempt at establishing a connection between the master chip (e.g., central control unit 222) and the slave chip (e.g., communication unit 221) was not successful and the method enters error handling mode (step 406). In error handling mode, an error event is logged and the master chip (e.g., central control unit 222) continues booting the firmware image from the merchant device 21 as described above.

If no errors are received in response to the initial handshake request, a connection has been established between the master chip (e.g., central control unit 222) and the slave chip (e.g., communication unit 221). So, the method is able to initiate a firmware download (FWDL) process (step 407) after resetting the firmware update (FWUP) metadata (i.e. offset=0, where the offset is used to keep track of how much data has been transmitted), or in other words, after resetting the FWUP state machine. The offset increases as data is transmitted. The first step is to give the slave chip (e.g., communication unit 221) an opportunity to reset, or initialize, any buffers, and/or states, and/or variables. If the slave chip (e.g., communication unit 221) does reset any buffers, and/or states, and/or variables, a response is sent from the slave chip (e.g., communication unit 221) at step 407. The response is received by the master chip (e.g., central control unit 222) (step 408) so the master chip (e.g., central control unit 222) can read the response. If the response is not valid at step 409 for any reason and an error is received by the master chip (e.g., central control unit 222) instead of a valid response in relation to resetting any buffers, and/or states, and/or variables, the response is re-sent to the master chip (e.g., central control unit 222). The response is then checked one or more times, and potentially up to five times. If an error is received in response to checking of the re-sent response(s), the start of the firmware update process was not successful, and the method enters error handling mode (step 406). If the response is valid (at step 409), then the slave chip (e.g., communication unit 221) sends a success response to the master chip (e.g., central control unit 222).

Steps 410 to 415 describe the method of attempting to gain verification from the slave chip (e.g., communication unit 221) to ensure the firmware image is valid. At step 410, if an offset is not less than an image size (i.e. if the entire firmware image has been transmitted to the slave chip (e.g., communication unit 221) so there is no more firmware data to be sent to the slave chip (e.g., communication unit 221) and the offset will not increase any more), the master chip (e.g., central control unit 222) requests the slave chip (e.g., communication unit 221) to perform any one of a plurality of verification checks before the firmware image is booted to the slave chip (e.g., communication unit 221) (step 411). The plurality of verification checks may involve proving that the image was created by a trusted source, verifying the integrity of the firmware, verifying the firmware image using an algorithm, verifying the signature of the firmware image, or performing a cryptographic signature check. The firmware image may be verified using a verification key, or a signature, or a Sign Key. If the check does not produce an error and any response from the slave chip (e.g., communication unit 221) is valid, the host chip requests the slave chip (e.g., communication unit 221) to apply the update by booting the firmware image (step 411). If the boot is successful, the slave chip (e.g., communication unit 221) sends a success response to the master chip (e.g., central control unit 222) (step 412). If the success response is not valid and an error is received by the master chip (e.g., central control unit 222), the response is re-sent to the master chip (e.g., central control unit 222). The response is checked one or more times, and potentially up to five times. If an error is received in response to the re-sent response, the firmware update was not successful, and the error event is logged (step 413). After step 413, the entire firmware update is complete so, if there are more updates to continue with, the master chip (e.g., central control unit 222) may continue booting (step 415) a firmware image from the merchant device 21 as described above.

If the success response is valid and the entire firmware update process is complete, the firmware data in the upgrade slot 223 of the master chip (e.g., central control unit 222) is erased (step 414). This enables the storage of low amounts of data on the master chip (e.g., central control unit 222), thereby reducing the amount of memory used in the payment reader 22. After step 415, the master chip (e.g., central control unit 222) continues booting (step 415) the firmware image from the merchant device 21 as described above until a valid firmware image is verified at the master chip (e.g., central control unit 222).

Steps 416 to 427 describe the method of sending the firmware data to the slave chip (e.g., communication unit 221) and considering the number of errors identified during firmware data transfer to dynamically change the bit rate of firmware data transfer to increase speed, with the aim of reducing the number of errors associated with transferring the firmware data.

If the offset is less than the image size (i.e. if there is still data to be transferred to the slave chip (e.g., communication unit 221) so the offset has not yet incremented to the value of the image size), a data packet is sent from the master chip (e.g., central control unit 222) containing the firmware data for the update (step 416). The data packet is either a minimum number of bytes set by the user or by the manufacturer, or the difference between the number of bytes in the total image size (or file size) and currently transferred number of bytes. In either case, the transferred number of bytes to the slave chip (e.g., communication unit 221) will be equal to or less than the total image size, or the number of bytes in the total image. When the master chip (e.g., central control unit 222) begins transferring the firmware data to the slave chip (e.g., communication unit 221), the data transfer rate is set at a maximum data transfer rate. After the data packet transfer and at step 417, if the slave chip (e.g., communication unit 221) returns with an error, i.e. the response from the slave chip (e.g., communication unit 221) is not valid, an error event is logged (step 418). At step 419, if the number of errors does not exceed a threshold indicative that the data transfer rate needs changing, the slave chip (e.g., communication unit 221) sends a response to the master chip (e.g., central control unit 222) to inform the master chip (e.g., central control unit 222) that the data transfer rate does not need to be decreased from the maximum data transfer rate and the method returns to step 410 to again consider whether the offset is or is not less than the image size. If, however, at step 419 the number of errors does exceed a threshold indicative that the data transfer rate needs changing, the number of errors is logged at step 420. After the errors are logged at step 420, the data transfer rate is decreased (step 421) if the current bit rate is greater than a minimum bit rate. The data transfer rate may be reduced by the current bit rate minus the minimum bit rate divided by two. If the current bit rate is greater than or equal to the minimum bit rate at step 422, the bit rate is stored as a bad bit rate at step 423, i.e. the bit rate at which communication has failed and/or an error has occurred. The method then returns to step 410 to again consider whether the offset is or is not less than the image size. If the current bit rate is not greater than or equal to the minimum bit rate (i.e. the current bit rate is less than the minimum bit rate), the method enters error handling mode (step 406).

If, at step 417 in response to the data packet transfer, the slave chip (e.g., communication unit 221) sends a success response to the master chip (e.g., central control unit 222) because the data packet was successfully transferred, previously recorded errors are considered (step 424). If there have not been any previously recorded errors (step 424), the offset is considered (step 427). If there have been previously recorded errors (step 424), and the number of successes is less than a threshold deemed to be acceptable (step 425), the offset is considered (step 427). When the offset is considered, it is considered whether the minimum number of bytes set by the user or by the manufacturer can be sent in the next packet, or whether the difference between the number of bytes in the total image size (or file size) and the currently transferred number of bytes should be sent in the next packet. If the offset is a number greater than a number of bytes that would allow the next packet to be the minimum of the number of bytes that can be sent in one packet (i.e. there are fewer than the minimum number of bytes left to be sent to the slave chip (e.g., communication unit 221)), then the next packet has the difference between the number of bytes in the total image size and the currently transferred number of bytes. If the offset is a number equal to or less than a number of bytes that would allow the next packet to be the minimum of the number of bytes that can be sent in one packet, then the next packet has the minimum of the number of bytes that can be sent in one packet. The method then returns to step 410 to again consider whether the offset is or is not less than the image size.

If, however, there have been previously recorded errors (step 424), but the number of successes is more than a threshold deemed to be acceptable (step 425), the data transfer rate is increased (step 426) if possible. This is due to a rate of errors in the firmware data received at the slave chip being at an acceptable level that indicates the data could be transferred faster. The data transfer rate may be increased by the bad bit rate, i.e. the bit rate at which communication has failed and/or an error has occurred, minus the current bit rate divided by two. The number of errors is then reset because the data transfer rate has already been changed due to the current number of errors. After resetting the number of errors, the offset is considered as outlined above and the method returns to step 410 to again consider whether the offset is or is not less than the image size.

An unacceptable level is one where data has to be resent such that the overall transfer time increases. This may indicate that the data should be transferred slower. An unacceptable level may also be when the number of errors increases over a threshold. Hence, when the number of errors is above a threshold the data rate is slowed. The threshold may indicate an error rate that is reducing the overall transfer time. The increasing and decreasing of data transfer rate allows the dynamic changing of bit rate depending on the number of errors detected to increase the speed at which the firmware data can be pushed through to the slave chip (e.g., communication unit 221) with a reduced amount of errors. There is a balance between speed and number of errors. The number of errors may be referred to herein as "error rate", "error data", an "error indicator", or a "number of errors for a given time period".

Error Detection and Mitigation

In some arrangements, the slave chip (e.g., communication unit 221) sends an error message to the master chip (e.g., central control unit 222) when a packet of data has not been received successfully. The error message may include packet information, information in relation to the type of error, and information in relation to when the packet of data is re-sent to the slave chip (e.g., communication unit 221). In this manner, the master chip (e.g., central control unit 222) is able to track the number of errors via any error messages received from the slave chip (e.g., communication unit 221). The error rate or an indication of the number of errors is then determined by the master chip (e.g., central control unit 222). The error rate may be based on a number of requests for packets of the transferred firmware data to be resent being received by the master device from the slave device over a period of time.

In some arrangements, the slave chip (e.g., communication unit 221) tracks the number of errors depending on how many packets have failed to be received or dropped. The slave chip (e.g., communication unit 221) may send an error report or an indication of the number of errors to the master chip (e.g., central control unit 222).

The master chip (e.g., central control unit 222) is a control unit so it is able to use information received in relation to errors to increase or decrease the bit rate or keep the bit rate the same. The information may include a number of errors, a time period in which the number of errors were received, a frequency of errors, or a type of error e.g. defining whether a packet dropped or was corrupted or did not retain integrity. When firmware data is transferred in packets, the packets may include checksum data to enable the slave chip (e.g., communication unit 221) to check whether the firmware data received at the slave chip (e.g., communication unit 221) matches (e.g., is the same as) the firmware data sent from the master chip (e.g., central control unit 222) in order to check the type of error and whether or not the integrity of the packet was maintained. In other words, the checksum data enables a check as to whether the firmware data received in a packet at the payment terminal matches (e.g., is the same as) the firmware data sent in the same packet by a firmware installation device.

In some arrangements, when an error occurs at the slave chip (e.g., communication unit 221), a request may be sent to the master chip (e.g., central control unit 222) to request the master chip (e.g., central control unit 222) to resend a packet or number of packets if an error was included during the transfer.

The slave chip (e.g., communication unit 221) may send the error information periodically, e.g. after each error occurs, or after a set or default number of errors have occurred, or after a set or default number of errors have occurred in a set time period, or after a set or default time period depending on the type of data being sent by the master chip (e.g., central control unit 222). The frequency at which the error information is sent from the slave chip (e.g., communication unit 221) to the master chip (e.g., central control unit 222) can be set by the master chip (e.g., central control unit 222), or by the user, and can be changed.

In some arrangements, the slave chip (e.g., communication unit 221) is able to use any gathered error information to send instructions to the master chip (e.g., central control unit 222) to increase or decrease the bit rate or keep the bit rate the same. In this manner, the speed of data transmission is throttled based on the slave chip's own determination, without the requirement of the master chip determining whether to change the speed.

In the arrangements described, the data transfer rate is set at a maximum data transfer rate (i.e. 100%) and reduced where necessary depending on the number of errors at the slave chip (e.g., communication unit 221). In some arrangements, the data transfer rate is reduced by half (i.e. to 50%) if there is an unacceptable number of errors. This data transfer rate may be increased by a quarter (i.e. to 75%) and reduced or increased depending on the number of errors. As described, the number of errors may be considered periodically, or after a set or default number of errors have occurred, or after a set or default number of errors have occurred in a set time period, or after a set or default time period depending on the type of data being sent by the master chip (e.g., central control unit 222). In some arrangements, if there has been a consistent number of errors and the error rate is below a second threshold, the data transfer rate is increased.

However, if the error rate is above a first threshold, the data transfer rate is reduced. When the error rate is above a first threshold, the error rate is unacceptable, i.e. there are too many errors occurring, which may result in the overall time taken to transfer data to increase compared to transferring at a lower speed with a lower error rate. When there are a large amount of errors occurring, even if the data transfer rate is high, the resend rate may increase the time that the payment reader 22 is inactive beyond an acceptable rate. Therefore, it is important to consider both the number of errors and the speed of data transfer.

Figure 5:
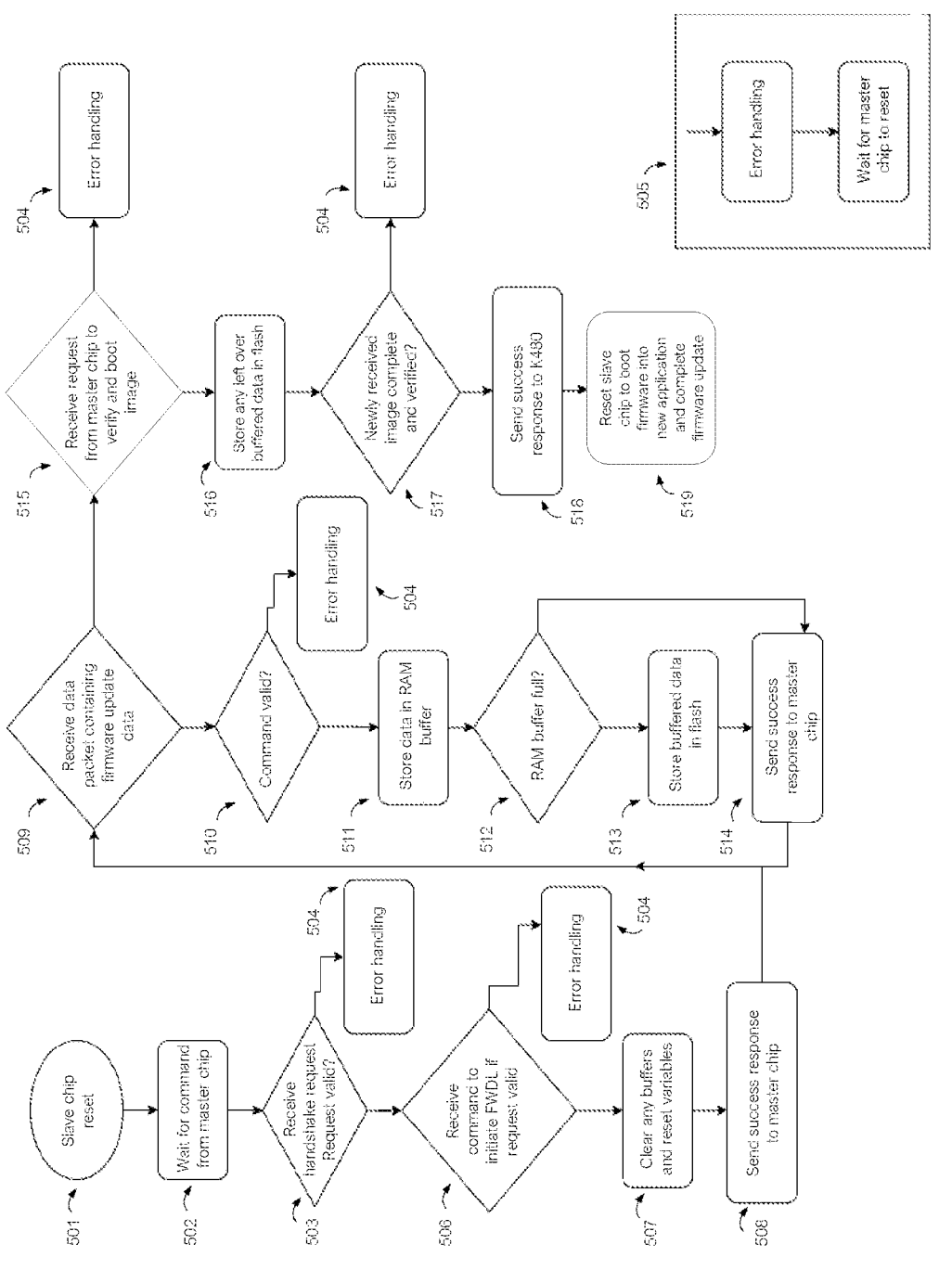
FIG. 5 illustrates an example flow diagram illustrating exemplary steps for updating firmware of a payment reader from the perspective of a communication unit of the payment reader.

FIG. 5 illustrates an example flow diagram illustrating exemplary steps for updating firmware of a payment reader 22 from the perspective of a communication unit of the payment reader 22. The description of FIG. 5 focuses on the internal functioning and interactions of the chips in the payment reader 22. Since the central control unit 222 controls the operation of the communication unit 221, these two units will be referred to as the slave chip and master chip, similarly to FIG. 4. It will be appreciated that the processes described in relation to FIG. 5 may apply to any master chip updating a related slave chip.

Steps 501 to 508 describe the method of establishing communication between the master chip (e.g., central control unit 222) and the slave chip (e.g., communication unit 221) and setting up the payment reader 22 for proceeding with a firmware update after the firmware data has been written to the master chip (e.g., central control unit 222). Steps 501 to 508 use the central controller of the master chip (e.g., central control unit 222) and the bootloader of the slave chip (e.g., communication unit 221) before any firmware data packets are sent from the master chip (e.g., central control unit 222) to the slave chip (e.g., communication unit 221).

At step 501, the slave chip (e.g., communication unit 221) is reset or undergoes a chip reset (as previously described in relation to the master chip (e.g., central control unit 222)) and then waits for a command from the master chip (e.g., central control unit 222) (step 502) to begin the initialization process for the firmware update. The slave chip (e.g., communication unit 221) waits for a command due to a request to check for new firmware updates by a user of the payment terminal 20 or due to a notification received at the payment terminal 20 from a server. After the slave chip (e.g., communication unit 221) is reset and at step 503, a handshake request is sent from the master chip (e.g., central control unit 222) and received at the slave chip to quickly verify that the master chip (e.g., central control unit 222) can communicate with the slave chip (e.g., communication unit 221) and/or that the slave chip (e.g., communication unit 221) is currently running and/or to establish communication with the slave chip (e.g., communication unit 221) after the reset. If the slave chip (e.g., communication unit 221) produces an error (step 504), the slave chip (e.g., communication unit 221) waits for the master chip (e.g., central control unit 222) to reset in error handling mode (step 505). The master chip (e.g., central control unit 222) resets in an attempt to establish a connection between the master chip (e.g., central control unit 222) and the slave chip (e.g., communication unit 221).

If no errors are produced in response to the initial received handshake request at step 503, the method initiates the firmware download (FWDL) process (step 506) which gives the slave chip (e.g., communication unit 221) an opportunity to reset or clear or initialize any buffers, and/or, states, and/or variables (step 507). If the slave chip (e.g., communication unit 221) produces an error (step 504) for any reason, the slave chip (e.g., communication unit 221) waits for the master chip (e.g., central control unit 222) to reset in error handling mode (step 505). This is in an attempt to validly begin the FWDL process between the master chip (e.g., central control unit 222) and the slave chip (e.g., communication unit 221). If no errors are produced by the slave chip (e.g., communication unit 221) and the slave chip (e.g., communication unit 221) validly receives the initiation for the FWDL process from the master chip (e.g., central control unit 222), the slave chip (e.g., communication unit 221) is validly given the opportunity to reset or clear or initialize any of the following: buffers, and/or, states, and/or variables (step 507). If step 507 is complete, the slave chip (e.g., communication unit 221) sends a success response to the master chip (e.g., central control unit 222) (step 508) to inform the master chip (e.g., central control unit 222) that the firmware update may progress.

After a valid set up, steps 509 to 514 describe the method of storing received firmware data packets at the slave chip (e.g., communication unit 221) when the data packets are actively being sent from the master chip (e.g., central control unit 222).

At step 509, the slave chip (e.g., communication unit 221) receives a data packet sent from the master chip (e.g., central control unit 222) containing the firmware data for the update. The data packet includes a command relating to the firmware upgrade. If the slave chip (e.g., communication unit 221) produces an error (step 504) in response to the command of the data packet, i.e. the data packet is not valid, the slave chip (e.g., communication unit 221) waits for the master chip (e.g., central control unit 222) to reset in error handling mode (step 505) in an attempt to receive a valid packet from the master chip (e.g., central control unit 222). If the command within the data packet received at the slave chip (e.g., communication unit 221) is valid (step 510), the slave chip (e.g., communication unit 221) stores the firmware data in a RAM buffer (or a RAM slot 225) at step 511. Packets of firmware data are buffered in the RAM to make use of a faster dynamic speed when compared with sending all of the firmware data at once. The RAM stores the packets of firmware data until it is full or until a specified amount of data has been received, then the specified amount of data is written to flash, or the active slot 226. The specified amount of data may be less than the total amount of data included in the firmware data.

After step 511, the method considers whether the RAM buffer is full. If the RAM buffer is full (step 512), the buffered firmware data stored in the RAM buffer is then sent to and read by the slave chip (step 513), and subsequently stored in flash memory of the slave chip (e.g., communication unit 221). The RAM buffer sends buffered data elsewhere when full to enable the receipt of further packets of data. The buffered data is sent to the flash memory to be flashed to the payment reader 22. Flashing data in this manner results in a different version, or an updated version, of the payment reader 22 being loaded or booted, thereby enabling the upgrade. After step 513 or if the RAM buffer is not full at step 512, the slave chip (e.g., communication unit 221) sends a success response to the master chip (e.g., central control unit 222) (step 514) to inform the master chip (e.g., central control unit 222) that packets of data can keep being sent to the slave chip (e.g., communication unit 221). This is possible because the RAM buffer of the slave chip (e.g., communication unit 221) is not full and can store further packets of data. The method then returns to step 509 to continue sending packets of data to the slave chip (e.g., communication unit 221) to continue with the upgrade or installation.

Steps 509 and 515 to 521 describe the method of storing the remaining firmware data packets at the slave chip (e.g., communication unit 221) when there are no more data packets to be received from the master chip (e.g., central control unit 222) at the slave chip (e.g., communication unit 221) and completing the firmware upgrade.

If there are no more data packets to be received from the master chip (e.g., central control unit 222) at step 509, the slave chip (e.g., communication unit 221) receives a request from the master chip (e.g., central control unit 222) to perform any verification checks at the slave chip (e.g., communication unit 221) (step 515). The verification checks may be cryptographic checks, to check that the firmware data is signed by a trusted party, or integrity checks, to check that the data is not tampered with. If the check at the slave chip (e.g., communication unit 221) produces an error (step 504) at step 513, the slave chip (e.g., communication unit 221) waits for the master chip (e.g., central control unit 222) to reset in error handling mode (step 505). If the check at the slave chip (e.g., communication unit 221) does not produce an error, the host ship requests the slave chip (e.g., communication unit 221) to boot into the new firmware image (step 515). This allows the installation or upgrade of the firmware of the payment reader 22 using the bootloader of the slave chip (e.g., communication unit 221) and the firmware image stored in the flash memory of the slave chip (e.g., communication unit 221). After the slave chip (e.g., communication unit 221) has successfully installed the firmware image, the slave chip (e.g., communication unit 221) sends any leftover buffered firmware data stored in the RAM buffer to the flash memory of the slave chip (e.g., communication unit 221) (step 516). There may be leftover buffered firmware data if the entire firmware update has been sent to the slave chip (e.g., communication unit 221) and the threshold for writing buffered firmware data in the RAM to the flash memory has not yet been reached. If the slave chip (e.g., communication unit 221) produces an error (step 504) at step 515 due to the slave chip (e.g., communication unit 221) not validly installing the firmware image, the slave chip (e.g., communication unit 221) waits for the master chip (e.g., central control unit 222) to reset in error handling mode (step 505).

If the newly received and installed firmware image at the slave chip (e.g., communication unit 221) is not complete and cannot be verified at step 517, i.e. the boot and/or installation was not successful, and an error is received by the master chip (e.g., central control unit 222) (step 504) in error handling, the slave chip (e.g., communication unit 221) waits for the master chip (e.g., central control unit 222) to reset in error handling mode (step 505) with the aim of receiving a complete and verified firmware image ready for application. If the newly received and installed firmware image at the slave chip (e.g., communication unit 221) is complete and can be verified at step 517, i.e. the boot and/or installation was successful, then at step 518, the slave chip (e.g., communication unit 221) sends a success response to the master chip (e.g., central control unit 222) signaling that the firmware image is correct and valid. As a final step 519, the slave chip (e.g., communication unit 221) is reset to boot the firmware update into a new application and/or apply the firmware update within the firmware data of the payment reader 22. Step 519 completes the firmware upgrade/update.

Figure 6:
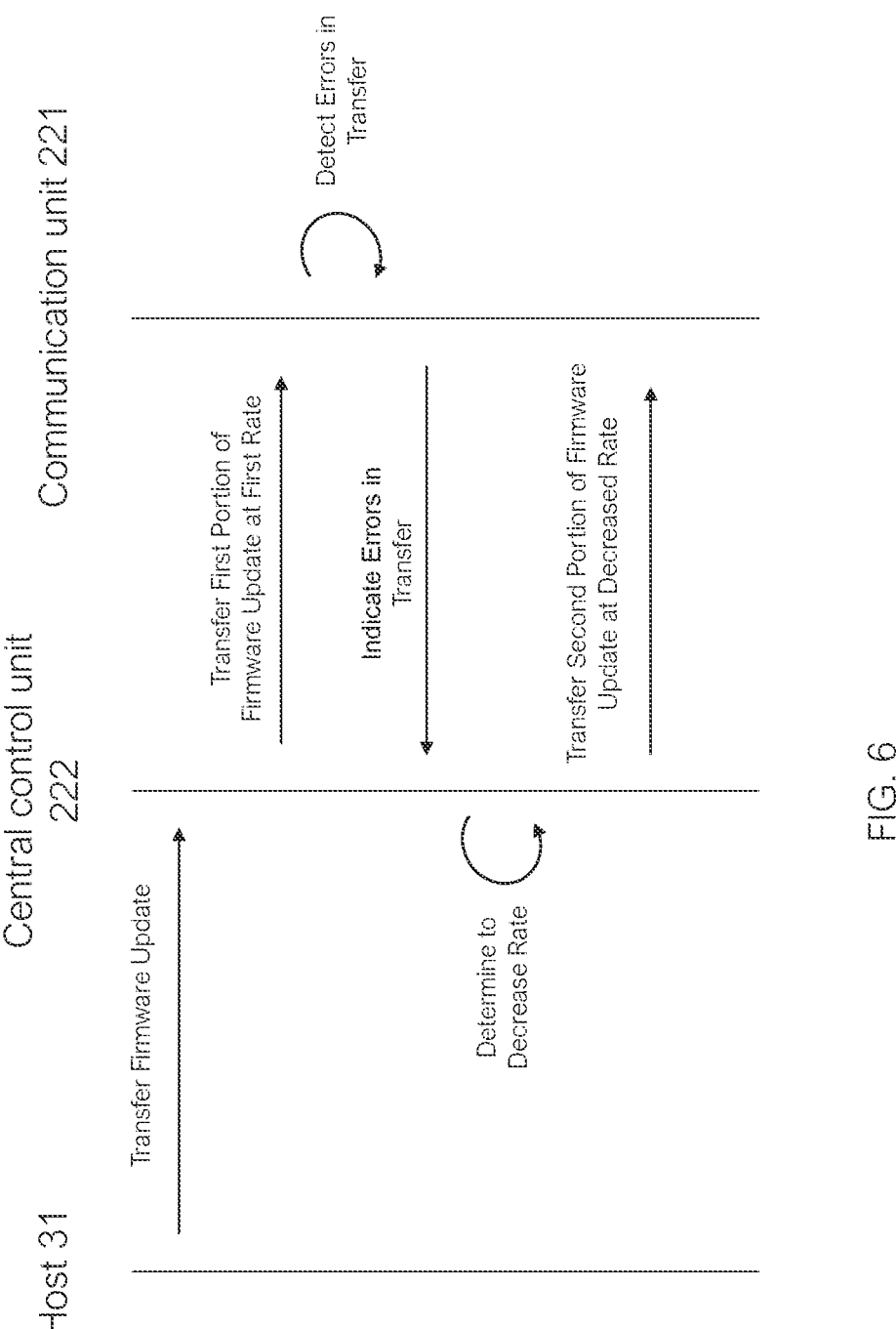
FIG. 6 illustrates an example swim-lane diagram of interactions between a host, central control unit, and communication unit.

FIG. 6 illustrates an example swim-lane diagram of interactions between the host 31, the central control unit 222, and the communication unit 221. The host 30 may transfer a firmware update to the central control unit 222. For example, the host 30 may transfer an entirety of a firmware update for the communication unit 221 to the central control unit 222.

The central control unit 222 may transfer a first portion of the firmware update at a first rate. For example, the central control unit 222 may transfer four kilobytes of the firmware at one Megabit per second.

The communication unit 221 may detect errors in the transfer. For example, the communication unit 221 may determine from checksums of the first portion of the firmware update as received by the communication unit 221 that particular bytes in the first portion were received by the communication unit 221 with errors. The communication unit 221 may indicate the errors in the transfer to the central control unit 222. For example, the communication unit 221 may provide a request to the central control unit 222 to resend bytes in which errors were detected.

The central control unit 222 may determine to decrease a rate of transfer. For example, the central control unit 222 may determine that a rate of errors satisfies a criteria of at least 20% errors and determine to half the rate of transfer to five hundred kilobits per second. The central unit 222 may transfer a second portion of the firmware update at the decreased rate. For example, the central unit 222 may transfer another four kilobytes of the firmware at five hundred kilobits per second.

As additional portions of the firmware are transferred from the central control unit 222 to the communication unit 221, the communication unit 221 may continue detecting errors and the central control unit 222 may both increase the rate while errors are below a particular threshold and decrease the rate while errors are above another particular threshold.

The arrangements described herein are not limited to master and slave relationships between devices as described in the primary arrangements. Any devices may be considered if one device is receiving firmware data ready for applying to the other device.

Although it will be understood that any suitable wireless communication device may be updated, in an exemplary arrangement the wireless communication device may be a payment reader.

The foregoing is merely illustrative of the principles of this disclosure and various modifications may be made by those skilled in the art without departing from the scope of this disclosure. The above described arrangements are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the following clauses.

As a further example, variations of apparatus or process parameters (e.g., dimensions, configurations, components, process step order, etc.) may be made to further improve the provided structures, devices and methods, as shown and described herein. In any event, the structures and devices, as well as the associated methods, described herein have many applications. Therefore, the disclosed subject matter should not be limited to any single arrangement described herein, but rather should be construed in breadth and scope in accordance with the appended clauses.

The phrases "in some examples," "according to various examples," "in the examples shown," "in one example," "in other examples," "various examples," "some examples," and the like generally mean the particular feature, structure, or characteristic following the phrase is included in at least one example of the present disclosure, and may be included in more than one example of the present disclosure. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS application, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some arrangements, one or more blocks of the process can be omitted entirely. Moreover, the methods can be combined in whole or in part with each other or with other methods.

Examples are set out below.

A computer-implemented method for controlling a speed of transferring firmware data from a master device to a slave device as part of a firmware installation process such that the firmware data is installed on the slave device with reduced disruption to the slave device during the firmware installation process is disclosed. The method may comprise transferring, from the master device to the slave device, the firmware data at a data transfer rate. The method may also comprise detecting, at the slave device, errors in the transfer of the firmware data from the master device to the slave device. The method may also comprise receiving, at the master device from the slave device, information indicative of the detected errors. The method may also comprise determining, at the master device based on the received information that indicates the detected errors, whether to: increase the data transfer rate due to a number of errors in the firmware data received at the slave device being at a first level that indicates the data could be transferred faster, or decrease the data transfer rate due to the number of errors in the firmware data received at the slave device being at a second level. The second level may indicate that too much data is having to be resent which may indicate that the data should be transferred slower. The method may also comprise varying and/or adjusting, at the master device, the data transfer rate based on the determining direction in which to vary or adjust the data transfer rate (e.g., whether to increase or decrease the data transfer rate) depending on the number of errors in the firmware data received at the slave device.

The master device may begin transferring the firmware data to the slave device. The data transfer rate may be set at a maximum data transfer rate to maximize the speed of transferring the firmware data from the master device to the slave device. The data transfer rate may be reduced if the number of errors is determined to be at a level determined to negatively impact a time taken to transfer the firmware data.

The receiving information that indicates the detected errors may comprise receiving information from the slave device that a specific data packet of the firmware data had one or more errors thereby requesting the resending of the specific packet.

The determining of the direction in which to adjust the data transfer rate (e.g., whether to increase or decrease the data transfer rate) can depend on the number of errors in the firmware data received at the slave device may comprise collating data relating to the detected errors over a period of time and determining whether or not the number of errors identified during the period of time is at a level determined to negatively impact a time taken to transfer the firmware data. In this case, the data transfer rate may be varied.

The computer-implemented method may further comprise disabling the slave device before starting transferring the firmware data. The computer-implemented method may further comprise installing the firmware data on the slave device once the firmware data has been transferred. The computer-implemented method may further comprise enabling the slave device after the firmware data has been installed on the slave device, in some cases causing the slave device to use the firmware data.

The master device and/or the slave device may be chips on a computing system such as a POS or a terminal.

A computer-implemented method is disclosed that comprises transferring, from a master device to a slave device at a data transfer rate, firmware data for installation on the slave device. The method may comprise receiving, at the master device from the slave device, information indicative of one or more errors in the firmware data received at the slave device. The method may also comprise varying or adjusting, at the master device, the data transfer rate responsive to the information indicative of one or more errors.

The computer-implemented method may further comprise determining error data from the information indicative of one or more errors. The information indicative of one or more errors may be a breadth of error data or a number of errors. The error data may be an error rate. The error data may comprise identifying an error rate. The identifying the error rate may comprise: receiving information from the slave device indicative of the error rate. If the data transfer rate is a first data transfer rate, and if an unacceptable error rate is identified, the data transfer rate may be reduced to a second data transfer rate that is lower than the first data transfer rate such that the error rate in a further transfer of the firmware data is reduced. If the data transfer rate is a first transfer rate, and if an error rate is identified at a level determined to negatively impact a time taken to transfer the firmware data, the data transfer rate may be reduced to a second transfer rate.

In some examples, the computer-implemented method may comprise: comparing the error rate to at least one threshold; and determining, based on the comparing of the error rate and the at least one threshold, a direction in which to adjust the data transfer rate.

In some examples, the computer-implemented method may comprise: comparing the error rate to a first threshold and a second threshold; and determining, based on the comparing of the error rate to the first threshold and the second threshold, to: reduce the data transfer rate if the error rate is greater than the first threshold; and increase the data transfer rate if the error rate is less than the second threshold.

In some examples, the data transfer rate is a first data transfer rate, and wherein adjusting the data transfer rate responsive to the information indicative of the one or more errors includes reducing the data transfer rate to a second data transfer rate to reduce the error rate for further data transfer.

In some examples, the data transfer rate is a first data transfer rate, and wherein adjusting the data transfer rate responsive to the information indicative of the one or more errors includes reducing the data transfer rate to a second data transfer rate based on a determination that the error rate is at a level determined to negatively impact a time taken to transfer the firmware data.

The determining error data from the information indicative of the one or more errors may further comprise comparing the error rate to one or more thresholds. The varying or adjusting of the data transfer rate responsive to the information indicative of the one or more errors may comprise one or more of: reducing the data transfer rate if the error rate is greater than a first threshold of the one or more thresholds; and increasing the data transfer rate if the error rate is less than a second threshold of the one or more thresholds.

In some examples, when the master device begins transferring the firmware data to the slave device, the data transfer rate is set at a maximum data transfer rate to maximize the speed of transferring the firmware data from the master device to the slave device, and wherein the direction in which to adjust the transfer rate is down to reduce the data transfer rate based on a number of the detected errors being at a level that is determined to negatively impact a time taken to transfer the firmware data.

The information from the slave device indicative of the error rate may be an indication that the error rate is over a threshold indicative that the data transfer rate needs changing. If the error rate is above a first threshold, the data transfer rate may be reduced, and if the error rate is below a second threshold, the data transfer rate may be increased.

In some examples, the computer-implemented method may comprise: determining an error rate based on receipt, at the master device from the slave device over a period of time, of a number of requests for packets of the transferred firmware data to be resent being received by the master device; wherein the information indicative of the one or more errors includes a request, from the slave device to the master device, for a packet of the transferred firmware data to be resent because of an error included in the packet as transferred; and wherein the adjusting of the data transfer rate responsive to the information indicative of the one or more errors includes adjusting the data transfer rate responsive to the determined error rate.

The information indicative of one or more errors may be a request, from the slave device to the master device, for a packet of the transferred firmware data to be resent because the packet included an error when transferred.

The determining error data from the information indicative of the one or more errors may further comprise determining an error rate based on a number of requests for packets of the transferred firmware data to be resent being received by the master device from the slave device over a period of time.

The varying or adjusting of the data transfer rate responsive to the information indicative of the one or more errors may be responsive to the determined error rate.

The firmware data may be transferred in packets which include checksum data to enable the slave device to check whether the firmware data received at the slave device matches (e.g., is the same as) the firmware data sent from the master device.

When the master device begins transferring the firmware data to the slave device, the data transfer rate may be set at a maximum data transfer rate. The master device and slave device may be within a single system. The single system may be one of a POS, a terminal, or a cryptocurrency hardware wallet.

In some examples, the computer-implemented method comprises: setting the data transfer rate at a maximum data transfer rate for a start of the transferring of the firmware data from the master device to the slave device.

The firmware data may be a firmware update of a version of firmware already installed on the slave device and the installing is an installation of the firmware update. The master device may be a factory installation device. The step of transferring may be a part of an initial factory installation process.

The master device may determine if the data transfer rate needs to be varied.

A computer-implemented method is disclosed comprising receiving, at the slave device, firmware data transferred from the master device. The firmware data may be transferred at a first data transfer rate. The method may further comprise checking, at the slave device, the received firmware data for errors. The method may also comprise ending, from the slave device to the master device, information indicative of one or more errors in the firmware data received at the slave device. The method may further comprise receiving, at the slave device from the master device, the firmware data at a second data transfer rate different to the first data transfer rate The master device may vary or adjust the data rate between the first and second data rates responsive to the information received at the master device from the slave device indicative of one or more errors in the firmware data received at the slave device.

The computer-implemented method may further comprise installing the firmware on the slave device.

The received firmware data may be stored in random access memory, RAM, until a specified amount of data has been received, then the specified amount of data is written to flash. The specified amount of data may be less than the total amount of data included in the firmware data.

A computing system is disclosed comprising a first processing device that is arranged to implement any method disclosed herein at a master device. The computing system may also comprise a second processing device arranged to implement any method disclosed herein at the slave device. The computing device may be one of a POS, a terminal, or a cryptocurrency hardware wallet. The first processing device may be a master device and the second processing device may be a slave device.

What is claimed is:

1. A computer-implemented method for controlling a speed of transferring firmware data from a primary device to a secondary device as part of a firmware installation process such that the firmware data is installed on the secondary device with reduced disruption to the secondary device during the firmware installation process, the method comprising:

transferring, from the primary device to the secondary device, the firmware data at a data transfer rate;

receiving, from the secondary device, an error message requesting that a packet of the firmware data be re-sent based on the packet of the firmware data not being successfully received by the secondary device;

re-sending the packet of the firmware data based on the error message;

tracking, at the primary device, an error rate based on a quantity of error messages received from the secondary device, the error messages including the error message;

comparing, at the primary device, the error rate with a first threshold error level and a second threshold error level;

adjusting the data transfer rate at the primary device based on the comparison between the error rate, the first threshold error level, and the second threshold error level, wherein adjusting the data transfer rate modifies an overall time of the firmware installation process; and completing transfer of the firmware data from the primary device to the secondary device to cause the firmware data to be installed on the secondary device and to cause the secondary device to use the firmware data.

2. The computer-implemented method of claim 1, wherein when the primary device begins transferring the firmware data to the secondary device, the data transfer rate is set at a maximum data transfer rate to maximize the speed of transferring the firmware data from the primary device to the secondary device, and wherein adjusting the data transfer rate includes reducing the data transfer rate based on the quantity of error messages being at a level that is determined to negatively impact a time taken to transfer the firmware data.

3. The computer-implemented method of claim 1, wherein receiving the error message includes receiving information from the secondary device that a specific data packet of the firmware data had one or more errors thereby requesting resending of the specific data packet; and wherein the comparison includes collating data relating to the error rate over a period of time and determining whether the error rate identified during the period of time is at a level determined to negatively impact a time taken to transfer the firmware data to cause the data transfer rate to be varied.

4. The computer-implemented method of claim 1, further comprising:

disabling the secondary device before starting transferring the firmware data; and enabling the secondary device after the firmware data has been installed on the secondary device.

5. The computer-implemented method of claim 1, wherein the primary device and the secondary device are both chips of a computing system.

6. A computer-implemented method comprising:

transferring, from a primary device to a secondary device at a data transfer rate, firmware data for installation on the secondary device;

receiving, at the primary device from the secondary device, an error message requesting that a packet of the firmware data bere-sent based on the packet of the firmware data not being successfully received by the secondary device;

re-sending the packet of the firmware data based on the error message;

tracking, at the primary device, an error rate based on a quantity of error messages received from the secondary device, the error messages including the error message;

comparing, at the primary device, the error rate with a first threshold error level and a second threshold error level;

adjusting the data transfer rate at the primary device based on the comparison between the error rate, the first threshold error level, and the second threshold error level, wherein adjusting the data transfer rate modifies an overall time of installation for the firmware data; and completing transfer of the firmware data from the primary device to the secondary device to cause the firmware data to be installed on the secondary device and to cause the secondary device to use the firmware data.

7. The computer-implemented method of claim 6, wherein the error message is transmitted by the secondary device after a set number of errors have occurred in a set time period.

8. The computer-implemented method of claim 7, wherein at least one of the set number of errors and the set time period is determined by the primary device.

9. The computer-implemented method of claim 8, further comprising:

determining, based on the comparison between the error rate, the first threshold error level, and the second threshold error level, a direction in which to adjust the data transfer rate.

10. The computer-implemented method of claim 8, wherein adjusting the data transfer rate includes determining, based on the comparison between the error rate to the first threshold error level and the second threshold error level, to:

reduce the data transfer rate if the error rate is greater than the first threshold error level; or increase the data transfer rate if the error rate is less than the second threshold error level.

11. The computer-implemented method of claim 8, wherein the data transfer rate is a first data transfer rate, and wherein adjusting the data transfer rate responsive to the error rate includes reducing the data transfer rate to a second data transfer rate to reduce the error rate for further data transfer.

12. The computer-implemented method of claim 8, wherein the data transfer rate is a first data transfer rate, and wherein adjusting the data transfer rate responsive to the error rate includes reducing the data transfer rate to a second data transfer rate based on a determination that the error rate is at a level determined to negatively impact a time taken to transfer the firmware data.

13. The computer-implemented method of claim 8, wherein receiving the error message includes receiving the error message from the secondary device.

14. The computer-implemented method of claim 6, further comprising:

determining the error rate based on receipt, at the primary device from the secondary device over a period of time, of a number of requests for packets of the transferred firmware data to be resent being received by the primary device;

wherein the error message includes a request, from the secondary device to the primary device, for a packet of the transferred firmware data to be resent because of an error included in the packet as transferred; and wherein the adjusting of the data transfer rate responsive to the error rate includes adjusting the data transfer rate responsive to the error rate.

15. The computer-implemented method of claim 6, wherein the firmware data is transferred in packets that include checksum data to enable the secondary device to check whether the firmware data received at the secondary device matches the firmware data sent from the primary device.

16. The computer-implemented method of claim 6, further comprising:

setting the data transfer rate at a maximum data transfer rate for a start of the transferring of the firmware data from the primary device to the secondary device.

17. The computer-implemented method of claim 6, wherein the primary device and the secondary device are both part of a single system.

18. The computer-implemented method of claim 17, wherein the single system is one of a Point-of-Sale (POS) device, a terminal, or a cryptocurrency hardware wallet.

19. The computer-implemented method of claim 6, wherein the firmware data is a firmware update of a version of firmware already installed on the secondary device, and wherein causing the firmware data to be installed on the secondary device includes causing the secondary device to update the version of firmware using the firmware data.

20. The computer-implemented method of claim 6, wherein the primary device is a factory installation device, and wherein the transferring of the firmware data is a part of an initial factory installation process for the secondary device.

21. The computer-implemented method of claim 6, wherein the primary device determines whether the data transfer rate needs to be adjusted based on the error rate.

22. A computer-implemented method comprising:

receiving, at a secondary device, firmware data transferred from a primary device, wherein the firmware data is transferred at a first data transfer rate;

checking, at the secondary device, the received firmware data for errors;

sending, from the secondary device to the primary device, an error message requesting that a packet of the firmware data be re-sent based on the packet of the firmware data not being successfully received by the secondary device, in response to receipt of the error message at the primary device, the primary device re-sends the packet of the firmware data based on the error message and tracks an error rate based on a quantity of error messages received from the secondary device, the error messages including the error message;

receiving, at the secondary device from the primary device, the firmware data at a second data transfer rate different to the first data transfer rate, wherein the primary device adjusts to the second data transfer rate responsive to a comparison between the error rate, a first error threshold, and a second error threshold;

installing the firmware data on the secondary device after receipt of the firmware data at the secondary device; and using the firmware data at the secondary device.

23. The computer-implemented method of claim 22, further comprising:

storing the firmware data in random access memory (RAM) until receipt of at least a specified amount of the firmware data at the secondary device; and storing the firmware data in flash memory after receipt of at least the specified amount of the firmware data at the secondary device.

24. The computer-implemented method of claim 23, wherein the specified amount of data is less than an entirety of the firmware data.

* * * * *